US010280939B2

(12) United States Patent
Tanaka et al.

(10) Patent No.: US 10,280,939 B2
(45) Date of Patent: May 7, 2019

(54) FAN CASE AND FAN CASE MANUFACTURING METHOD

(71) Applicants: IHI Corporation, Koto-ku (JP); IHI AEROSPACE CO., LTD., Koto-ku (JP)

(72) Inventors: Agamu Tanaka, Koto-ku (JP); Yuji Mori, Koto-ku (JP); Takashi Harada, Koto-ku (JP); Ikuo Okumura, Koto-ku (JP); Kenji Ishimoto, Koto-ku (JP)

(73) Assignees: IHI CORPORATION, Koto-ku (JP); IHI AEROSPACE CO., LTD., Koto-ku (JP)

( * ) Notice: Subject to any disclaimer, the term of this patent is extended or adjusted under 35 U.S.C. 154(b) by 354 days.

(21) Appl. No.: 15/186,641

(22) Filed: Jun. 20, 2016

(65) Prior Publication Data

US 2016/0290360 A1 Oct. 6, 2016

Related U.S. Application Data

(63) Continuation of application No. PCT/JP2014/080210, filed on Nov. 14, 2014.

(30) Foreign Application Priority Data

Dec. 20, 2013 (JP) ................. 2013-263774

(51) Int. Cl.
*F02K 1/64* (2006.01)
*F01D 25/24* (2006.01)
(Continued)

(52) U.S. Cl.
CPC ......... *F04D 29/526* (2013.01); *F01D 25/243* (2013.01); *F02K 1/64* (2013.01);
(Continued)

(58) Field of Classification Search
CPC ...... F01D 25/24; F01D 25/243; F01D 25/246; F02K 1/64; F02K 1/68; F02K 3/06; F04D 29/526; F05D 2260/36; F05D 2300/174
See application file for complete search history.

(56) References Cited

U.S. PATENT DOCUMENTS 8,021,102 B2 * 9/2011 Xie ................. B29C 70/086
  29/889.2
8,672,609 B2 * 3/2014 Lussier ............. F01D 21/045
  415/197
(Continued)

FOREIGN PATENT DOCUMENTS

JP 2007-113573 5/2007
JP 2008-128250 6/2008
(Continued)

OTHER PUBLICATIONS

International Search Report dated Feb. 24, 2015 in PCT/JP2014/080210, filed on Nov. 14, 2014 ( with English translation).
(Continued)

*Primary Examiner* — Kenneth Bomberg
*Assistant Examiner* — Jose M Siguenza, Jr.
(74) *Attorney, Agent, or Firm* — Oblon, McClelland, Maier & Neustadt, L.L.P.

(57) ABSTRACT

A cylindrical case body made of a composite material; a linking ring made of aluminum, fitted and fixed to a rear end portion of the case body and having an annular groove which receives a reverse thrust load from a reverse thrust transmission body; and ring constituent bodies made of titanium alloy, each of which is placed in the rear end portion of the case body and has an arcuate groove which undertakes a reverse thrust load larger than that received by the linking ring, are provided in a fan case. The ring constituent bodies are fitted in notches of the linking ring and are brought into contact with outward receiving walls of the linking ring. The
(Continued)

ring constituent bodies are positioned relative to the case body in the axis direction and in the radial direction, and the annular groove and the arcuate grooves continue to each other.

2 Claims, 6 Drawing Sheets

(51) Int. Cl.
*F04D 29/52* (2006.01)
*F02K 1/82* (2006.01)

(52) U.S. Cl.
CPC .......... *F02K 1/82* (2013.01); *F05D 2220/323* (2013.01); *F05D 2230/21* (2013.01); *F05D 2230/60* (2013.01); *F05D 2260/36* (2013.01); *F05D 2300/121* (2013.01); *F05D 2300/174* (2013.01); *F05D 2300/603* (2013.01); *Y02T 50/672* (2013.01)

(56) References Cited

U.S. PATENT DOCUMENTS

| | | | |
|---|---|---|---|
| 9,114,882 B2* | 8/2015 | Robertson, Jr. | B64D 27/26 |
| 9,677,425 B2* | 6/2017 | Lavignotte | F02K 1/70 |
| 9,920,654 B2* | 3/2018 | Dubois | B64D 29/06 |
| 2007/0086854 A1 | 4/2007 | Blanton | |
| 2007/0234706 A1 | 10/2007 | Gagneux et al. | |
| 2008/0115454 A1 | 5/2008 | Xie | |
| 2009/0155070 A1 | 6/2009 | Duchatelle et al. | |
| 2009/0260344 A1 | 10/2009 | Hoyland | |

FOREIGN PATENT DOCUMENTS

| | | |
|---|---|---|
| JP | 2009-150385 | 7/2009 |
| RU | 2 358 137 C2 | 6/2009 |
| RU | 2 472 677 C2 | 1/2013 |

OTHER PUBLICATIONS

Extended European Search Report dated Jul. 6, 2017 in Patent Application No. 14872614.4.

* cited by examiner

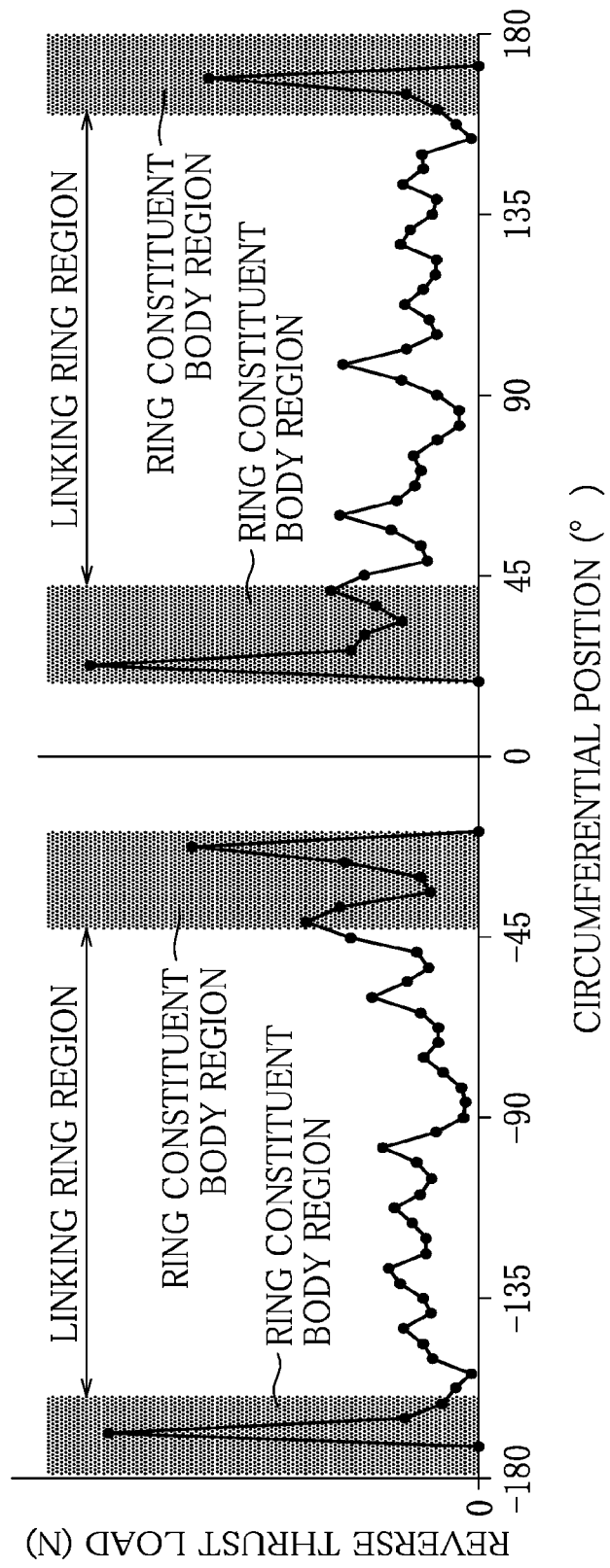

FAN CASE AND FAN CASE MANUFACTURING METHOD

TECHNICAL FIELD

An embodiment described herein relates to a fan case that covers fan blades of an aircraft jet engine, and to a method of manufacturing a fan case.

BACKGROUND ART

A fan case that covers fan blades of an aircraft jet engine, as described above, is required to be lightweight and have high strength. In order to meet such requirements, it is attempted to apply a composite material of reinforcing fibers and a thermosetting resin as a material of a fan case.

For example, Patent Document 1 describes a fan case that covers fan blades in which a carbon fiber composite material is used.

The fan case includes a cylindrical case body made of a carbon fiber composite material, and a plurality of arcuate ring constituent bodies located in an end portion of the case body for connection with a reverse thrust transmission body.

The ring constituent bodies are made of Ti alloy, and are fixed with rivets respectively in a state of being aligned in the circumferential direction on the end portion of the case body. By engaging an inward flange of the reverse thrust transmission body side with arcuate grooves formed along the respective outer peripheries of the ring constituent bodies, the case body and the reverse thrust transmission body are allowed to be linked to each other.

The fan case is manufactured such that a hole formed in each arcuate ring constituent body is aligned with a positioning portion formed at a predetermined location in the end portion of the cylindrical case body whereby the ring constituent body is positioned relative to the case body, and then a plurality of ring constituent bodies are fixed to the case body with rivets respectively.

BACKGROUND ART DOCUMENT

Patent Document

Patent Document 1: U.S. Patent Application Publication No. 2009/0260344

SUMMARY OF THE DISCLOSURE

Problems to be Solved by the Disclosure

However, in the conventional fan case described above, positioning of the ring constituent body relative to the case body is performed by aligning the hole formed in the arcuate ring constituent body with the positioning portion of the cylindrical case body made of a carbon fiber composite material. As such, it cannot be said that the positioning accuracy is high. Thus, there is a problem that even if the ring constituent bodies made of Ti alloy are placed at locations which are preferable for receiving a reverse thrust load, alignment of the respective arcuate grooves in the ring constituent bodies may be out of order so that the magnitude of the reverse thrust load received by the ring constituent bodies may become uneven. Solving this problem has been a challenge conventionally.

The present disclosure has been made focusing on the conventional problem described above. An object of the present disclosure is to provide a fan case and a method of manufacturing a fan case in which ring constituent bodies made of Ti alloy are able to be placed at locations preferable for receiving a reverse thrust load with high positioning accuracy, and consequently the ring constituent bodies are able to undertake the reverse thrust load evenly.

Means for Solving the Problems

In order to achieve the above object, an aspect of the present disclosure is directed to a fan case that covers fan blades of an aircraft jet engine. The fan case includes a case body in a cylindrical shape, a linking ring, and ring constituent bodies. The case body is made of a composite material in which reinforcing fibers are impregnated with a thermosetting resin. The linking ring is made of Al (aluminum), has an annular groove opened in a centrifugal direction, and is fitted and fixed to an outer peripheral side of a peripheral wall in a rear end portion of the case body, the rear end portion being located on a rear side of the aircraft jet engine. The annular groove is linked to a reverse thrust transmission body, and receives a reverse thrust load. The ring constituent body is made of Ti alloy, has an arcuate groove opened in the centrifugal direction, and is placed on the peripheral wall in the rear end portion of the case body. The arcuate groove is linked to the reverse thrust transmission body and undertakes a reverse thrust load larger than the reverse thrust load received by the linking ring. The fan case is configured such that the ring constituent body is fitted in a notch, the notch being formed in the linking ring and being opened toward the rear of the aircraft jet engine, whereby the linking ring and the ring constituent body are integrated with each other, that the ring constituent body is positioned relative to the case body in the axial direction and in the radial direction respectively by bringing the ring constituent body, placed on the peripheral wall of the case body, into contact with, and fixing the ring constituent body to, an outward receiving wall formed on the linking ring and protruding in the centrifugal direction, and that the annular groove of the linking ring and the arcuate groove of the ring constituent body continue to each other.

In the present disclosure, as the cylindrical case body is made of reinforcing fibers such as carbon fibers, the strength and the rigidity of the entire fan case are ensured.

Further, in the present disclosure, the linking ring made of Al and having the annular groove which receives the reverse thrust load from the reverse thrust transmission body, is fitted and fixed to the rear end portion of the case body, and the ring constituent bodies made of Ti alloy and having the arcuate grooves which receive a reverse thrust load larger than the reverse thrust load received by the linking ring, are fitted to the notches of the linking ring which is fixed to the case body. Then, the ring constituent bodies are brought into contact with the outward receiving walls of the linking ring and are fixed thereto. As such, positioning of the ring constituent bodies relative to the case body in the axial direction and in the radial direction is performed with high accuracy, respectively, and the annular groove of the linking ring and the arcuate grooves of the ring constituent bodies continue to each other with high accuracy as well.

Accordingly, in the present disclosure, the ring constituent bodies made of Ti alloy is able to be placed at locations preferable for receiving the reverse thrust load of the case body with high positioning accuracy, and the ring constituent bodies are able to undertake the reverse thrust load evenly.

Effects of the Disclosure

The present disclosure exhibits excellent advantageous effects that it is possible to place the ring constituent bodies made of Ti alloy at locations preferable for receiving the reverse thrust load with high positioning accuracy, and allow the ring constituent bodies to undertake the reverse thrust load evenly.

BRIEF DESCRIPTION OF THE DRAWINGS

FIG. 6 is a graph showing distribution of a reverse thrust load in a circumferential direction when the reverse thrust load is placed on the case body of FIG. 2.

MODE FOR CARRYING OUT THE DISCLOSURE

Hereinafter, the present disclosure will be described based on the drawings.

FIGS. 1 to 6 illustrate an embodiment of a fan case according to the present disclosure.

Figure 1:
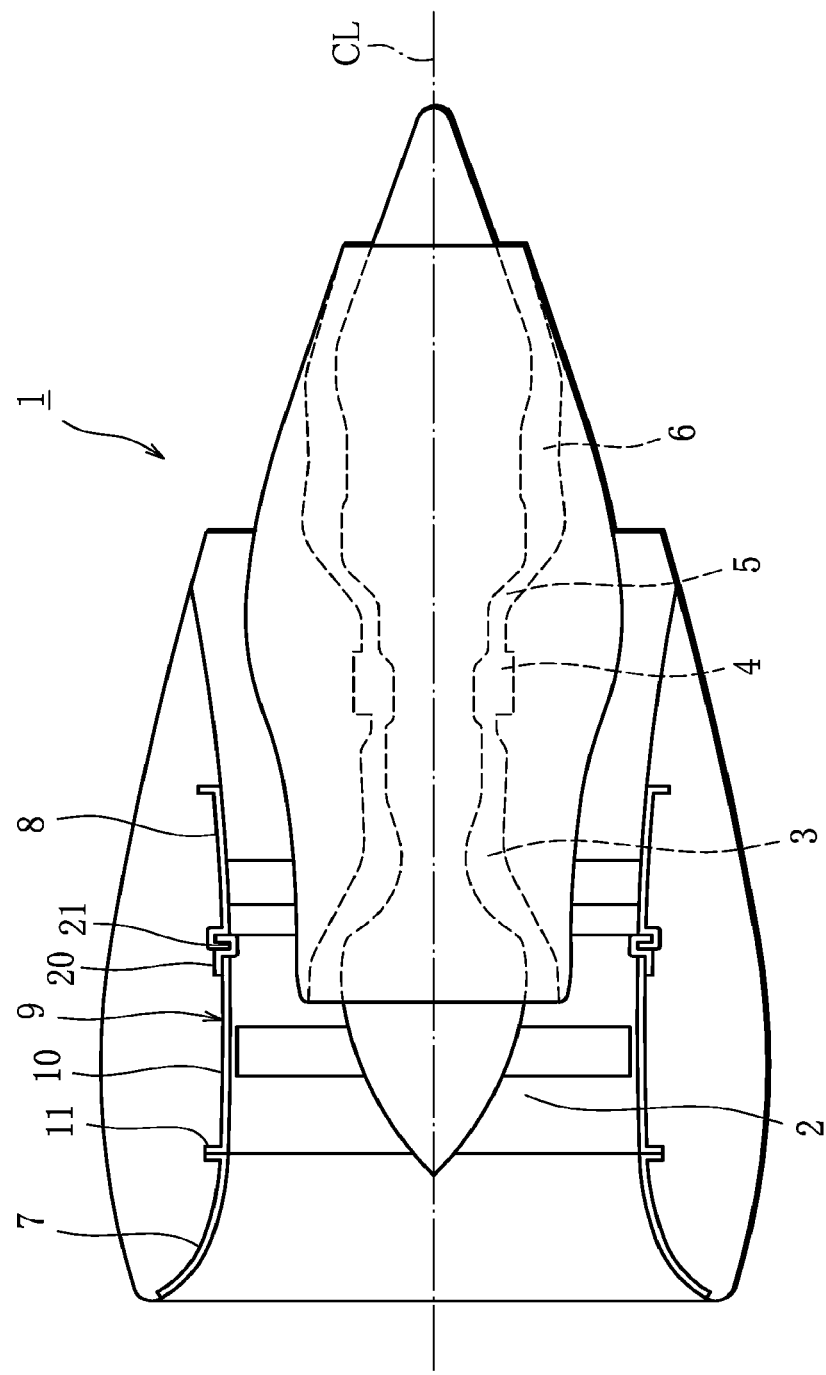
FIG. 1 is a schematic cross-sectional explanatory diagram of an aircraft jet engine adopting a fan case according to an embodiment of the present disclosure.

As shown in FIG. 1, an aircraft jet engine 1 is adapted such that an air taken from the front side (left side in the figure) is sent to a compressor 3 by a fan 2 having a plurality of fan blades, and to the air compressed by the compressor 3, fuel is injected and the resultant is combusted in a combustion chamber 4, whereby a high-pressure turbine 5 and a low-pressure turbine 6 are rotated by the expansion of the hot gas caused therefrom.

Figure 2:
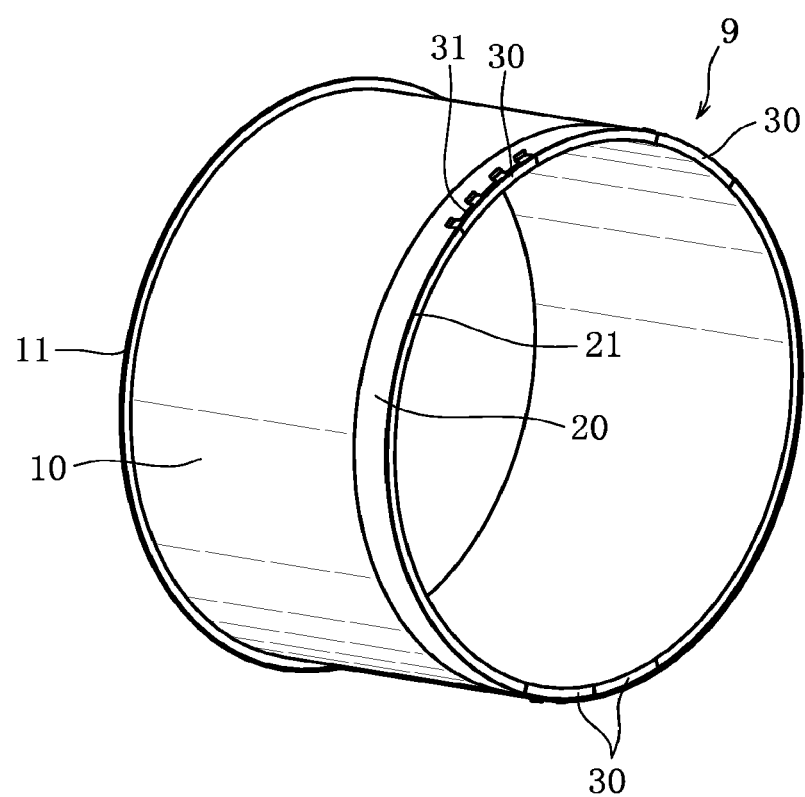
FIG. 2 is an overall perspective explanatory diagram illustrating a case body of the fan case in FIG. 1.

A fan case 9 that covers the fan blades of the fan 2 includes a cylindrical case body 10 made of a composite material in which reinforcing fibers such as carbon fibers are impregnated with a thermosetting resin such as an epoxy resin, as also shown in FIG. 2.

The reinforcing fibers of the composite material constituting the cylindrical case body 10 may be glass fibers, organic fibers (aramid, PBO, polyester, polyethylene), alumina fibers, or silicon carbide fibers, for example, other than the carbon fibers described above. As a matrix, the thermosetting resin may be a polyester resin, a vinyl ester resin, a phenol resin, a bismaleimide resin, an oxazoline resin, or a melamine resin, for example, other than the epoxy resin described above.

In a front end portion (left end portion in the figure) of the case body 10, an outward annular flange 11 connectable with an engine cowl 7 is formed, and in a rear end portion (right end portion in the figure), a linking ring 20 made of Al is fixed in a fitted state. The linking ring 20 has an annular groove 21 opened centrifugally. The annular groove 21 is formed to protrude in the axis CL direction from the rear end portion of the case body 10. The annular groove 21 is adapted to fit with a metal inward flange of a reverse thrust transmission body 8.

On the annular groove 21 of the linking ring 20, a reverse thrust load from a thrust reverser, not shown, is placed via the reverse thrust transmission body 8. However, the reverse thrust load is not placed evenly in the circumferential direction in the case body 10 in a state of being connected with the reverse thrust transmission body 8. For example, as shown in FIG. 6, the load is placed largely on a top peak region (region within ±20° to 45° on both sides of the peak) in the circumferential direction and on the vicinity of a bottom peak region (region within ±165° to 180° including the peak).

Figure 3:
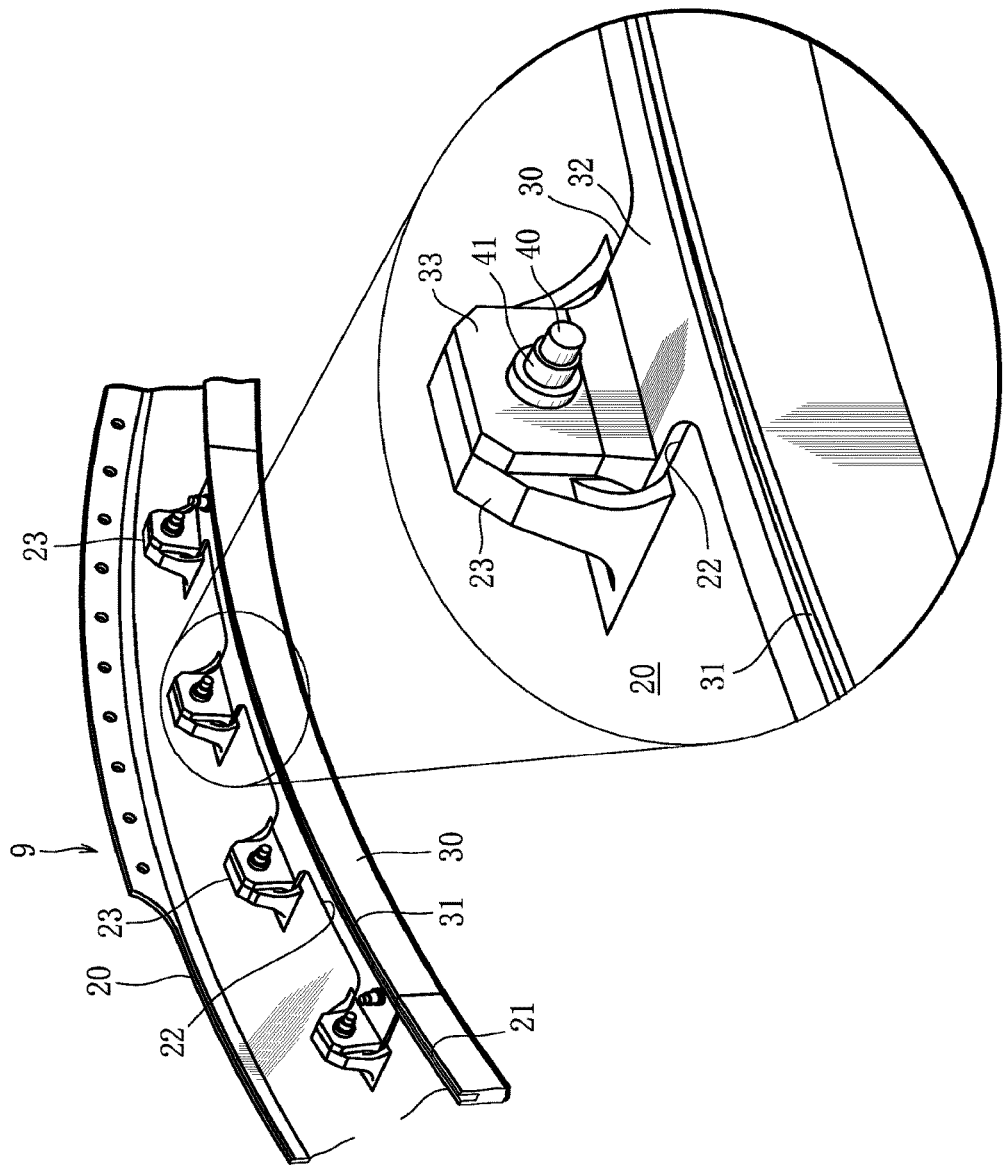
FIG. 3 is a partial perspective explanatory diagram illustrating a state where a ring constituent body is fixed to a linking ring of the case body of FIG. 2 by enlarging it, in a top peak region of the linking ring.
Figure 4:
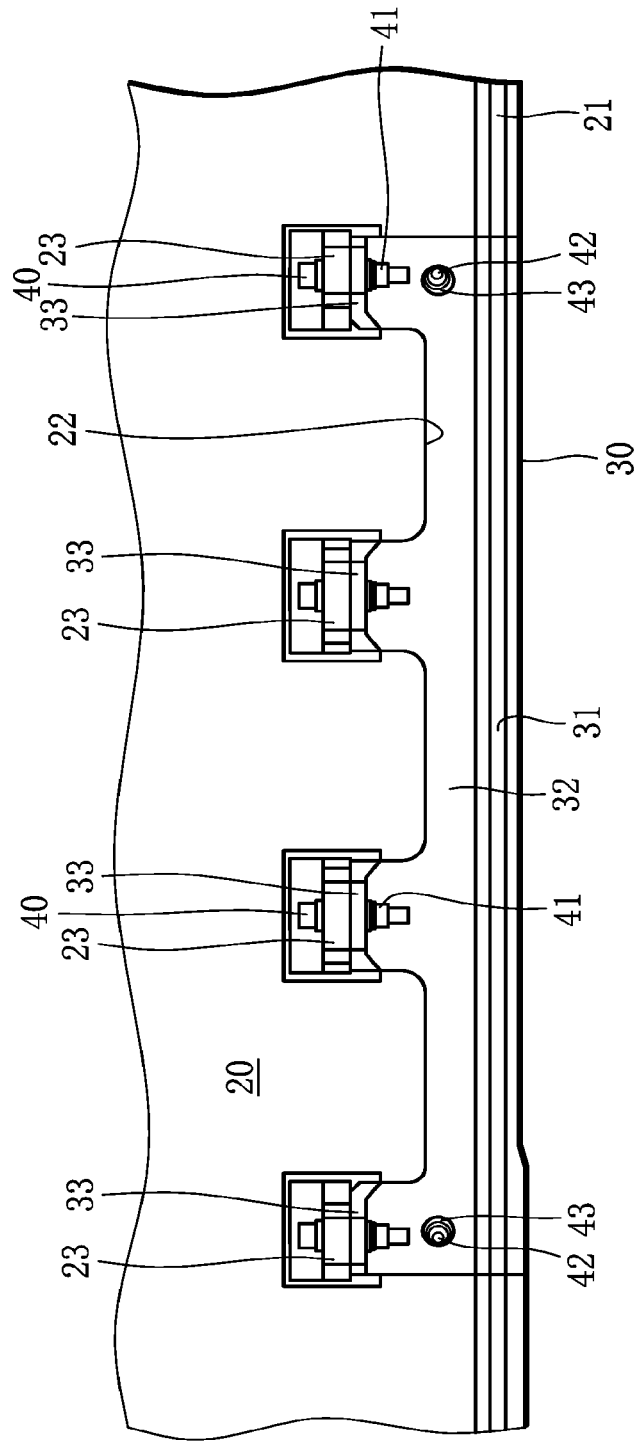
FIG. 4 is a partial plan explanatory diagram illustrating a state where a ring constituent body is fixed to the linking ring of the case body of FIG. 2 by enlarging it, in the top peak region of the linking ring.

As such, in that case, ring constituent bodies 30 made of Ti alloy are placed on four regions in total including two regions in the vicinity of the top peak region and two regions in the vicinity of the bottom peak region of the linking ring 20. Each of the ring constituent bodies 30 has an arcuate groove 31 continuing to the annular groove 21 of the linking ring 20. As shown in FIGS. 3 and 4, the ring constituent bodies 30 are fitted in notches 22 formed in the four regions of the linking ring 20, so as to form a part of the linking ring 20.

This means that the large reverse thrust load, placed on the four regions (ring constituent body regions), is undertaken by the arcuate grooves 31 of the ring constituent bodies 30 made of Ti alloy, and the reverse thrust load placed on the region other than the ring constituent body regions (linking ring region) is received by the annular groove 21 of the linking ring 20 made of Al.

Figure 5:
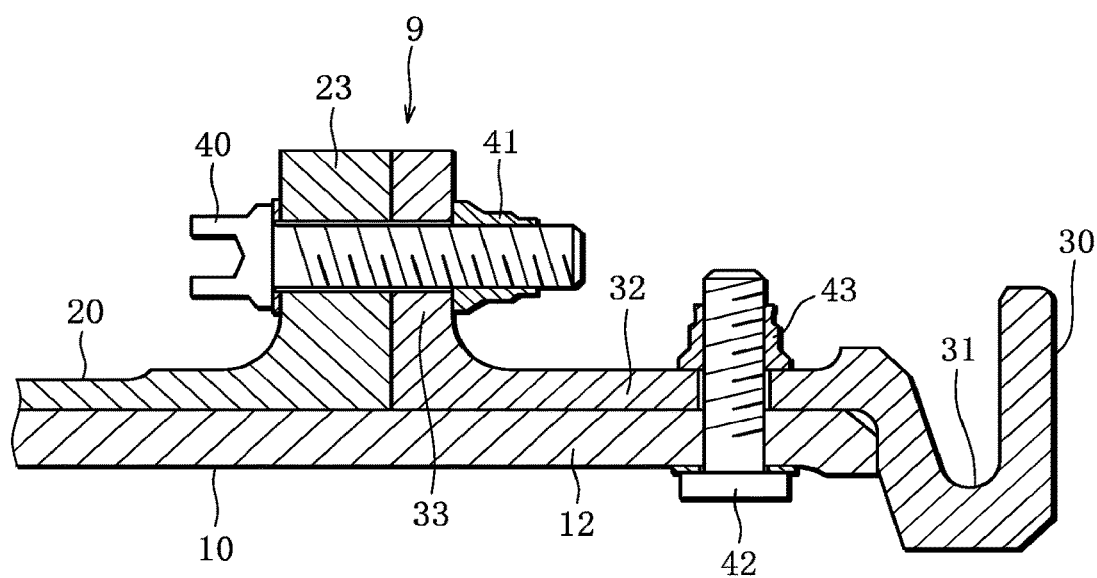
FIG. 5 is a partial cross-sectional explanatory diagram illustrating a state where a ring constituent body is fixed to the linking ring of the case body of FIG. 2 by enlarging it, in the top peak region of the linking ring.

In that case, a constituent main body 32 of the ring constituent body 30, which is brought into contact with a peripheral wall 12 in the rear end portion of the case body 10, is provided with a plurality of vertical walls (ring constituent body side fixing protrusions) 33. As also shown in FIG. 5, the vertical walls 33 are formed on an end portion opposite to the arcuate groove 31 of the constituent main body 32. The ring constituent body 30 is adapted to be integrated with the linking ring 20 in a state where positioning in the axis CL direction and the radial direction of the case body 10 is performed respectively, by superposing the vertical walls 33 on a plurality of outward receiving walls (linking ring side fixing protrusions) 23 formed on the linking ring 20, respectively, and fixing them with bolts 40 and nuts 41.

It should be noted that by fixing the constituent main body 32 of the ring constituent body 30 to the peripheral wall 12 in the rear end portion of the case body 10 with the bolts 42 and the nuts 43, jumping-up on both ends of the ring constituent body 30 is prevented.

In manufacturing the fan case 9 described above, first, the cylindrical case body 10 is molded using a composite material in which reinforcing fibers are impregnated with a thermosetting resin (the details are omitted).

Next, the linking ring 20 made of Al is fitted and fixed to the outer peripheral side of a peripheral wall 12 in the rear end portion of the cylindrical case body 10.

Next, on the peripheral wall 12 in the rear end portion of the case body 10, the ring constituent body 30 made of Ti alloy having the arcuate groove 31 is fitted to the notch 22 formed in the ring constituent body region of the linking ring 20 having been fixed, to thereby be integrated with the linking ring 20, and then, the vertical walls 33 of the ring constituent body 30 are brought into contact with the outward receiving walls 23 of the linking ring 20 and are fixed with the bolts 40 and the nuts 41. Thereby, positioning of the ring constituent body 30 relative to the case body 10 in the axis CL direction and in the radial direction is performed, respectively.

Subsequently, a series of groove finishing is applied to the annular groove 21 of the linking ring 20 and the arcuate groove 31 of the ring constituent body 30 which are allowed to continue to each other through each positioning of the ring constituent body 30 relative to the case body 10 in the axis CL direction and in the radial direction.

As described above, in the fan case 9 according to the present embodiment, as the cylindrical case body 10 is made of reinforcing fibers such as carbon fibers, the strength and the rigidity of the entire fan case 9 is ensured.

Further, in the fan case 9 according to the present embodiment, the linking ring 20 made of Al and having the annular groove 21 which receives the reverse thrust load from the reverse thrust transmission body 8, is fitted and fixed to the rear end portion of the case body 10, and to the notches 22 of the linking ring 20, the ring constituent bodies 30 made of Ti alloy and having the arcuate grooves 31 which receive a reverse thrust load larger than the reverse thrust load received by the linking ring 20, are fitted. Then, the vertical walls 33 of the ring constituent bodies 30 are brought into contact with the outward receiving walls 23 of the linking ring 20 and are fixed thereto with the bolts 40 and nuts 41. As such, positioning of the ring constituent bodies 30 relative to the case body 10 in the axis CL direction and the radial direction is performed with high accuracy, respectively. Thereby, the annular groove 21 of the linking ring 20 and the arcuate grooves 31 of the ring constituent bodies 30 continue to each other with high accuracy.

Accordingly, in the fan case 9 of the present embodiment, on the locations where a reverse thrust load larger than the reverse thrust load placed on the linking ring 20 is placed, that is, on the two regions in the vicinity of the top peak and the two regions in the vicinity of the bottom peak (ring constituent body regions) of the linking ring 20, the ring constituent bodies 30 made of Ti alloy can be placed with high positioning accuracy. Thereby, the four ring constituent bodies 30 can undertake a large reverse thrust load evenly, respectively.

Further, in a method of manufacturing a fan case according to the present embodiment, subsequent to fitting and fixing of the linking ring 20 made of Al to the rear end portion of the case body 10, the ring constituent bodies 30 made of Ti alloy, which undertake a large reverse thrust load, are fitted to the notches 22 of the linking ring 20 fixed to the case body 10, and then the ring constituent bodies 30 are brought into contact with the outward receiving walls 23 of the linking ring 20 and are fixed thereto. As such, positioning of the ring constituent bodies 30 relative to the case body 10 in the axis CL direction and in the radial direction can be performed easily with high accuracy, respectively.

In addition, as a series of groove finishing is applied to the annular groove 21 of the linking ring 20 and the arcuate groove 31 of the ring constituent body 30 which continue to each other, the annular groove 21 of the linking ring 20 and the arcuate groove 31 of the ring constituent body 30 can continue to each other with higher accuracy.

Configurations of the fan case and the method of manufacturing the fan case according to the present disclosure are not limited to the embodiment described above. For example, the ring constituent body region on which the ring constituent body 30 is placed is not limited to the region described in the above embodiment.

A first aspect of the present disclosure is directed to a fan case that covers fan blades of an aircraft jet engine. The fan case includes a case body in a cylindrical shape, a linking ring, and ring constituent bodies. The case body is made of a composite material in which reinforcing fibers are impregnated with a thermosetting resin. The linking ring is made of Al (aluminum), has an annular groove opened in the centrifugal direction, and is fitted and fixed to an outer peripheral side of a peripheral wall in a rear end portion of the case body, the rear end portion being located on a rear side of the aircraft jet engine. The annular groove is linked to a reverse thrust transmission body, and receives a reverse thrust load. The ring constituent body is made of Ti alloy, has an arcuate groove opened in the centrifugal direction, and is placed on the peripheral wall in the rear end portion of the case body. The arcuate groove is linked to the reverse thrust transmission body and undertakes a reverse thrust load larger than the reverse thrust load received by the linking ring. The fan case is configured such that the ring constituent body is fitted in a notch, the notch being formed in the linking ring and being opened toward the rear of the aircraft jet engine, whereby the linking ring and the ring constituent body are integrated with each other, that the ring constituent body is positioned relative to the case body in the axial direction and in the radial direction respectively by bringing the ring constituent body, placed on the peripheral wall of the case body, into contact with, and fixing the ring constituent body to, an outward receiving wall formed on the linking ring and protruding in the centrifugal direction, and that the annular groove of the linking ring and the arcuate groove of the ring constituent body continue to each other.

In the first aspect of the present disclosure, as the cylindrical case body is made of reinforcing fibers such as carbon fibers, the strength and the rigidity of the entire fan case are ensured.

Further, in the first aspect of the present disclosure, the linking ring made of Al and having the annular groove which receives the reverse thrust load from the reverse thrust transmission body, is fitted and fixed to the rear end portion of the case body, and the ring constituent bodies made of Ti alloy and having the arcuate grooves which receive a reverse thrust load larger than the reverse thrust load received by the linking ring, are fitted to the notches of the linking ring. Then, the ring constituent bodies are brought into contact with the outward receiving walls of the linking ring and are fixed thereto. As such, positioning of the ring constituent bodies relative to the case body in the axial direction and in the radial direction is performed with high accuracy, respectively, and the annular groove of the linking ring and the arcuate grooves of the ring constituent bodies continue to each other with high accuracy as well.

Accordingly, in the first aspect of the present disclosure, the ring constituent bodies made of Ti alloy are able to be placed at locations preferable for receiving the reverse thrust load of the case body with high positioning accuracy, and the ring constituent bodies are able to undertake the reverse thrust load evenly.

Further, a second aspect of the present disclosure is directed to a method of manufacturing a fan case that covers fan blades of an aircraft jet engine. The method includes the steps of: molding a case body in a cylindrical shape, the case body being made of a composite material in which reinforcing fibers are impregnated with a thermosetting resin; fitting and fixing a linking ring to an outer peripheral side of a peripheral wall in a rear end portion of the case body, the rear end portion being located on a rear side of the aircraft jet engine, the linking ring being made of Al and having an annular groove opened in the centrifugal direction, the annular groove being linked to a reverse thrust transmission body and receiving a reverse thrust load; fitting a ring constituent body into a notch formed in the linking ring and opened toward the rear of the aircraft jet engine, on the peripheral wall in the rear end portion of the case body, and integrating the ring constituent body with the linking ring, the ring constituent body being made of Ti alloy and having an arcuate groove opened in the centrifugal direction, the arcuate groove being linked to the reverse thrust transmission body and undertaking a reverse thrust load larger than the reverse thrust load received by the linking ring; positioning the ring constituent body relative to the case body in the axial direction and in the radial direction respectively, by bringing the ring constituent body, fitted in the notch of the linking ring on the peripheral wall of the case body, into contact with, and fixing the ring constituent body to, an outward receiving wall formed on the linking ring and protruding in the centrifugal direction; and performing a series of groove finishing to the annular groove of the linking ring and the arcuate groove of the ring constituent body which are allowed to continue to each other through each positioning of the ring constituent body relative to the case body in the axial direction and in the radial direction.

In the second aspect of the present disclosure, subsequent to fitting and fixing of the linking ring made of Al and having an annular groove which receives the reverse thrust load from the reverse thrust transmission body, to the rear end portion of the case body, the ring constituent bodies made of Ti alloy and having arcuate grooves which undertake a reverse thrust load larger than the reverse thrust load received by the linking ring, are fitted to the notches of the linking ring fixed to the case body. Then, the ring constituent bodies are brought into contact with the outward receiving walls of the linking ring and are fixed thereto. As such, positioning of the ring constituent bodies relative to the case body in the axial direction and the radial direction can be performed easily with high accuracy, respectively.

Then, as a series of groove finishing is applied to the annular groove of the linking ring and the arcuate grooves of the ring constituent bodies which are allowed to continue to each other through each positioning of the ring constituent bodies with respect to the case body in the axial direction and in the radial direction, the annular groove of the linking ring and the arcuate grooves of the ring constituent bodies can continue to each other with higher accuracy.

EXPLANATION OF REFERENCE SIGNS 1 aircraft jet engine
8 reverse thrust transmission body
9 fan case
10 case body
12 peripheral wall
20 linking ring made of Al
21 annular groove
22 notch
23 receiving wall (linking ring side fixing protrusion)
20 ring constituent body made of Ti alloy
31 arcuate groove
CL axis

The invention claimed is:
1. A fan case that covers fan blades of an aircraft jet engine, the fan case comprising:
a case body in a cylindrical shape, the case body being made of a composite material in which reinforcing fibers are impregnated with a thermosetting resin;
a linking ring, the linking ring being made of Al, having an annular groove opened in a centrifugal direction, and being fitted and fixed to an outer peripheral side of a peripheral wall in a rear end portion of the case body, the annular groove being being configured to be used for linking with a reverse thrust transmission body and receiving a first reverse thrust load; and
a ring constituent body, the ring constituent body being made of Ti alloy, having an arcuate groove opened in the centrifugal direction, and being located on the peripheral wall in the rear end portion of the case body, the arcuate groove being configured to be used for linking with the reverse thrust transmission body and undertaking a second reverse thrust load larger than the first reverse thrust load received by the linking ring, wherein
the ring constituent body is fitted in a notch, the notch being formed in the linking ring and being opened toward a rear of the aircraft jet engine, so that the linking ring and the ring constituent body are integrated with each other,
the ring constituent body is positioned relative to the case body in a radial direction and in an axial direction respectively by locating the ring constituent body on the peripheral wall of the case body, and by bringing the ring constituent body into contact with, and fixing the ring constituent body to, an outward receiving wall formed on the linking ring and protruding in the centrifugal direction, and
the annular groove of the linking ring and the arcuate groove of the ring constituent body are continuous with each other.

2. A method of manufacturing a fan case that covers fan blades of an aircraft jet engine, the method comprising:
molding a case body in a cylindrical shape, the case body being made of a composite material in which reinforcing fibers are impregnated with a thermosetting resin;
fitting and fixing a linking ring to an outer peripheral side of a peripheral wall in a rear end portion of the case body, the linking ring being made of Al and having an annular groove opened in a centrifugal direction, the annular groove being configured to be used for linking with a reverse thrust transmission body and receiving a first reverse thrust load;
fitting a ring constituent body into a notch formed in the linking ring and opened toward a rear of the aircraft jet engine, on the peripheral wall in the rear end portion of the case body, and integrating the ring constituent body with the linking ring, the ring constituent body being made of Ti alloy and having an arcuate groove opened in the centrifugal direction, the arcuate groove being configured to be used for linking with the reverse thrust transmission body and undertaking a second reverse thrust load larger than the first reverse thrust load received by the linking ring;
positioning the ring constituent body relative to the case body in a radial direction and in an axial direction respectively, by locating the ring constituent body on the peripheral wall of the case body, and by bringing the ring constituent body into contact with, and fixing the ring constituent body to, an outward receiving wall formed on the linking ring and protruding in the centrifugal direction; and
performing a series of groove finishing to the annular groove of the linking ring and the arcuate groove of the ring constituent body which are allowed to be continuous with each other through each positioning of the ring constituent body relative to the case body in the axial direction and in the radial direction.

* * * * *